(12) United States Patent
Noguchi et al.

(10) Patent No.: US 6,439,713 B1
(45) Date of Patent: Aug. 27, 2002

(54) POWDER COMPOSITION AND PROCESS OF FORMING LIQUID INK IMAGE USING SAME

(75) Inventors: Aino Noguchi; Yasuo Katano; Nobuyuki Yanagawa; Tadashi Saito; Kiyoshi Tanikawa; Kakuji Murakami, all of Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/359,913

(22) Filed: Jul. 26, 1999

(30) Foreign Application Priority Data

Jul. 24, 1998 (JP) .......................................... 10-209999
Dec. 25, 1998 (JP) .......................................... 10-371053

(51) Int. Cl.[7] .................................................. B41J 2/01
(52) U.S. Cl. ...................................... 347/103; 347/101
(58) Field of Search ................................ 347/103, 101; 525/326.1

(56) References Cited

U.S. PATENT DOCUMENTS 5,190,989 A * 3/1993 Himori ........................ 522/57

FOREIGN PATENT DOCUMENTS

JP  11188858 A  * 7/1999  .............. B41J/2/01

* cited by examiner

Primary Examiner—John Barlow
Assistant Examiner—Manish S Shah
(74) Attorney, Agent, or Firm—Oblon, Spivak, McClelland, Maier & Neustadt, P.C.

(57) ABSTRACT

A powder composition containing a powder of a modified polymer having a recurring unit containing at least one carboxyl group, the carboxyl groups of part of the recurring units being in the form of a salt with an aliphatic amine having at least 6 carbon atoms, and a powder of a surfactant. The powder composition is used for forming an image on a printing medium, in which method the composition is applied over a surface of a transfer medium to form a layer of the powder. An image of a liquid ink capable of dissolving or swelling the powder is then formed on the layer so that the viscosity of the liquid ink increases when contacted with the powder. The image on the transfer medium is contacted with the printing medium so that the image is transferred to the printing medium.

18 Claims, 1 Drawing Sheet

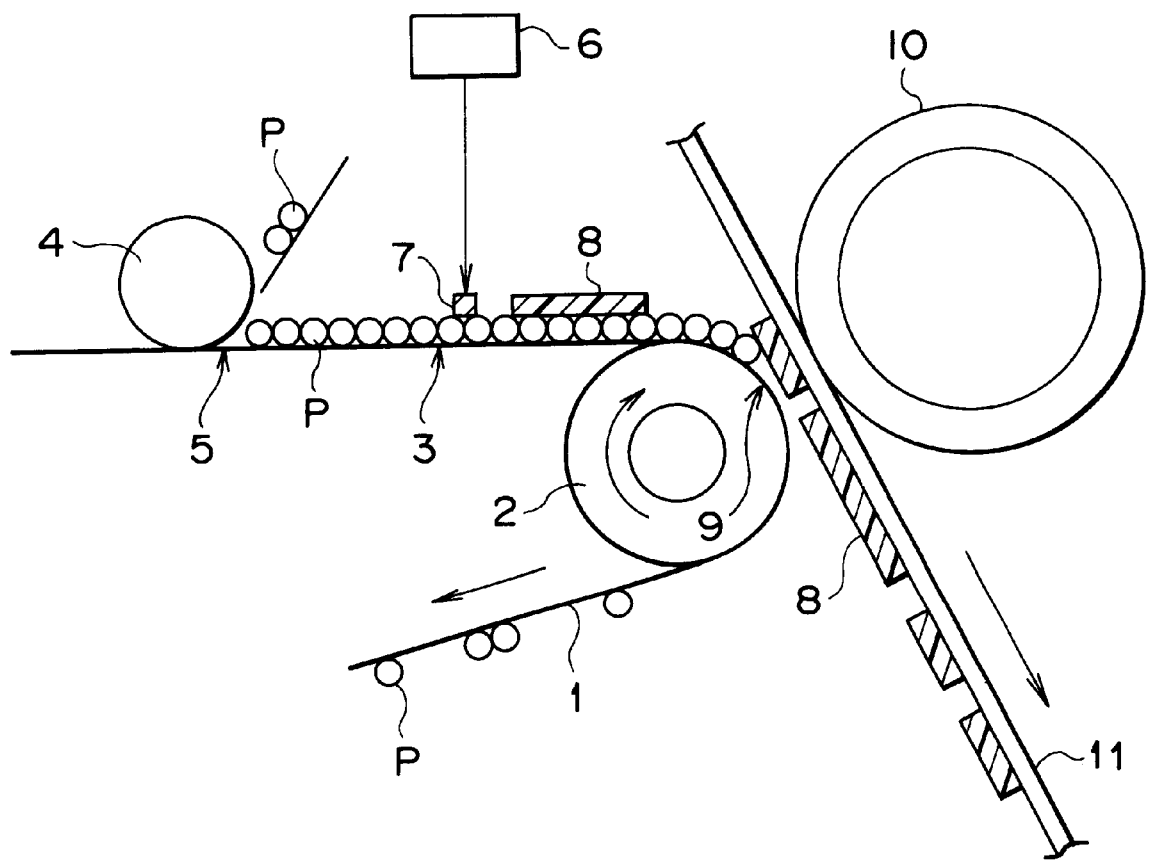

POWDER COMPOSITION AND PROCESS OF FORMING LIQUID INK IMAGE USING SAME

This invention relates to a powder composition useful for forming an image of a liquid ink on a printing medium. The present invention is also directed to a process for the formation of an image of a liquid ink on a printing medium using the powder composition.

An ink jet printer utilizing a smooth surfaced transfer drum is known (U.S. Pat. No. 4,538,156). With this ink jet printer, an image is formed on the transfer drum by a print head assembly having a number of ink jet nozzles. Thereafter, a printing medium, e.g. paper, is brought in rolling contact with the drum to transfer the image on the drum to the printing. The above ink jet printing method has a problem because the image formed on the transfer drum is apt to spread or deform during its transference to the paper.

To cope with this problem, JP-A-62-92849 proposes evaporating a solvent (water) of the ink of an image before the transference to a paper. This method, however, adversely affects high speed printing. JP-A-H3-55283 proposes cooling an image formed on a transfer drum to increase the viscosity of the ink. This method also adversely affects high speed printing.

SUMMARY OF THE INVENTION

It is an object of the present invention to provide a powder composition useful for forming an image of a liquid ink on a printing medium using a transfer medium without causing deformation of the image.

Another object of the present invention is to provide a process for the formation of an image of a liquid ink on a printing medium using a transfer medium without causing deformation of the image.

It is a special object of the present invention to provide an ink jet printing method using a transfer medium, in which deformation of an image is prevented.

In accomplishing the foregoing objects, there is provided in accordance with one aspect of the present invention a powder composition including a powder of a modified polymer having a recurring unit containing at least one carboxyl group, the carboxyl groups of part of the recurring units being in the form of a salt with an aliphatic amine having at least 6 carbon atoms, and a powder of a surfactant.

In another aspect, the present invention provides a process for forming an image-on a printing medium, including the steps of:

(a) applying a powder composition containing a powder of a modified polymer having a recurring unit containing at least one carboxyl group over a surface of a transfer medium to form a layer of the powder, the carboxyl groups of part of the recurring units being in the form of a salt with an aliphatic amine having at least 6 carbon atoms;

(b) forming an image of a liquid ink over the layer, the powder being soluble or swellable in the liquid ink so that the viscosity of the liquid ink increases when contacted with the powder; and (c) contacting the image on the transfer medium with the printing medium so that the image is transferred to the printing medium.

BRIEF DESCRIPTION OF THE DRAWINGS

Other objects, features and advantages of the present invention will become apparent from the detailed description of the preferred embodiments of the invention when considered in light of the accompanying drawing, in which:

the sole FIGURE is a schematic illustration of a printing device suitable for carrying out the process of the present invention.

DETAILED DESCRIPTION OF THE PREFERRED EMBODIMENTS OF THE INVENTION

Referring now to FIGURE, designated as 1 is a transfer medium in the form of an endless belt running in one direction and supported by a plurality of drive and driven rollers (only one roller 2 is shown) to define an image forming section generally indicated as 3. The endless belt transfer medium 1 has an outer surface made of a silicone rubber. A powder applying roll 4 is disposed upstream of the image forming section 3 to form a powder applying section 5 where a layer of a powder composition P is applied over an outer surface of the transfer medium 1.

Designated as 6 is a print head assembly of a conventional ink jet printer having a number of ink jet nozzles (not shown). Ink droplets 7 are injected from the nozzles to form a desired image 8 to the transfer medium 1 in the image forming section 3 on which the powder layer is formed.

As will be described in detail hereinafter, the powder composition P is soluble or swellable in the ink 7 so that the viscosity of the ink 7 increases when contacted with the powder composition P. The ink image 8 having thus increased viscosity is fed to an image transfer section 9, defined between the roller 2 and a pressure roller 10, where a printing medium such as paper 11 is also fed. Thus, in the transfer section 9, the ink image 8 is transferred from the transfer medium 1 to the printing medium 11.

The transfer medium 1 after exit from the image transfer section 9, which bears the powder composition P at positions corresponding to the background part of the image 8, is again fed to the powder applying section 5 to initiate the next image formation.

Since the liquid ink upon contacting with the powder composition has an increased viscosity, deformation of the transferred image 8 on the printing medium 11 is prevented so that the sharpness of the transferred image is improved. Further, even when a poor grade paper is used as the printing medium 11, blurs of the ink hardly occurs, because of the increase of the ink viscosity.

In the above embodiment, a rotating drum may be used in place of the endless belt as the transfer medium 1. Further, the image forming method according to the present invention is not limited to the ink jet printing method. A conventional stencil printing or offset printing method may be also adopted for the purpose of the present invention.

The powder composition P includes a powder of a modified polymer obtained by modifying a polymer having a recurring unit containing at least one carboxyl group with an aliphatic amine having at least 6 carbon atoms to partially neutralize the carboxyl groups. The recurring unit is preferably represented by one of the following formulas (I), (II) and (III):

-continued

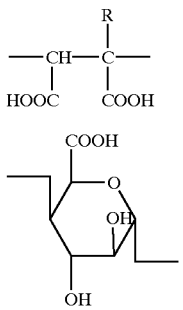

wherein R represents a hydrogen atom or a lower alkyl group.

Illustrative of suitable polymers (before the modification with the aliphatic amine) of the powder composition P are polyacrylic acid resins, copolymers of acrylic acid with methacrylic acid, polymethacrylic acid resins, polymaleic acid resins and copolymers of acrylic acid with maleic acid.

It is important that the carboxyl groups of part of the recurring units should be in the form of a salt with the aliphatic amine in order for the powder composition P to have a moderate moisture absorbing power and a long service life.

The aliphatic amine is preferably a compound represented by the following formula:

$$R^1R^2R^3N$$

wherein $R^1$, $R^2$ and $R^3$ independently selected from a hydrogen atom and alkyl groups having 6–18 carbon atoms, with the proviso that at least one of $R^1$, $R^2$ and $R^3$ stands for an alkyl group. Illustrative of suitable aliphatic amines are laurylamine, stearylamine, dodecylamine, rosin amine, polyallylamine, tributylamine, diamylamine and triallylamine.

Preferably, the aliphatic amine is used in such an amount that the amount of the monomer units of the modified polymer whose carboxyl groups are in the form of amine salts is 10–50% by weight based on the amount of the monomer units whose carboxyl groups are not neutralized with the amine for reasons of improved service life and improved viscosity increasing efficiency.

Thus, in one preferred embodiment of the present invention, the modified polymer may be a polymer having first monomeric units (which are not in the form of an amine salt) of the following formula:

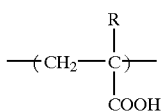

and second monomeric units (which are in the form of an amine salt) of by the following formula:

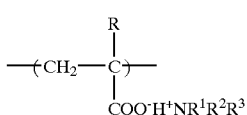

wherein R, $R^1$, $R^2$ and $R^3$ are as defined above, with the amount of the first units being 10–50% by weight based on the second units.

The modified polymer may be produced by heating a dispersion, in an organic solvent or medium, containing an aliphatic amine and a polymer having a recurring unit containing at least one carboxyl group. The reaction mixture is then cooled, filtered and dried to obtain the modified polymer.

It is preferred that the powder composition P contain a powder of a surfactant, e.g. a cationic, anionic, nonionic or amphoteric surfactant, for reasons of improved ink viscosity increasing efficiency. The amount of the surfactant powder is preferably 1–50% by weight based on the total weight of the surfactant powder and the polymer powder. Any surfactant may be used for the purpose of the present invention, though the use of a compound represented by the formula $R^4R^5OSO_3Na$ wherein $R^4$ and $R^5$ stand, independently from each other, an alkyl group having 6–18 carbon atoms is preferred. The surfactant may be incorporated into the powder composition P during or after the modification of the polymer with the aliphatic amine.

The powder composition P preferably has an average particle diameter of 0.1–50 μm, more preferably 0.1–10 μm, for reasons of improved viscosity increasing efficiency. Too small an average diameter less than 0.1 μm requires an increased cost for the preparation of the powder composition.

When the liquid ink contains an anionic pigment capable of associating with the amine salt of the powder, the pigment of an ink image formed on a layer of the powder composition P can be insolubilized, so that the ink image transferred to a printing medium has an improved water resistance. Such anionic pigments are, for example, in the form of a sulfonic acid salt or a carboxylic acid salt, such as C. I. Acid Red 27, C. I. Acid Blue 9, C. I. Acid Yellow 23, C. I. Direct Blue 199, C. I. Direct Yellow 86 and Food Black 2.

The following examples will further illustrate the present invention.

EXAMPLE 1

Using an ink jet printing device as shown in FIGURE, an image was formed on a high grade paper as a printing medium. A transfer medium formed of a silicone rubber was applied with a layer of a powder composition having an average particle diameter of about 1 μm and consisting of a modified polyacrylic acid resin containing neutralized acrylic acid monomeric units in the form of a stearyl amine salt and non-neutralized acrylic acid monomeric units. The amount of the former units was 10% by weight based on the latter non-neutralized units. An image of a liquid ink was formed by ink jet printing on the powder layer and was then transferred to one side of the paper. The image on the paper was found to be free of deformation and blurs. Further, the ink was found not to arrive the other side of the paper. The powder composition was found to have a good storage stability.

Comparative Example 1

Example 1 was repeated in the same manner as described except that a non-modified polyacrylic acid resin whose carboxyl groups were not at all neutralized was used. The image on the paper was found to be free of deformation and blurs. Further, the ink was found not to penetrate into the other side of the paper. However, the powder composition was unable to be used after short storage in the ambient atmosphere.

Comparative Example 2

Example 1 was repeated in the same manner as described except that a modified polyacrylic acid resin whose carboxyl groups were completely neutralized was used. The image on the paper was found to be deformed. Blurs were also found. The powder composition showed good storage stability.

EXAMPLE 2

A full color printing was performed with the same device as used in Example 1 using C. I. Acid Red 27, C. I. Acid Blue 9, C. I. Direct Yellow 86 and Food Black 2 as dyes. The powder applied to the transfer medium was modified polyacrylic acid powder whose carboxyl groups were partially neutralized with polyallylamine such that the amount of the neutralized acrylic acid monomeric units was 10% by weight of the non-neutralized acrylic acid monomeric units. The image on the paper was found to be free of deformation and blurs. Further, the ink was found not to penetrate into the other side of the paper. The powder composition was found to have good storage stability. Furthermore, the image had good water resistance.

EXAMPLE 3

Example 1 was repeated in the same manner as described except that laurylamine was substituted for stearylamine. The results similar to those in Example 1 were obtained.

EXAMPLE 4

Example 1 was repeated in the same manner as described except that the amount of the neutralized acrylic acid monomeric units was increased to 50% by weight. The results similar to those in Example 1 were obtained except that the sharpness of the image was inferior to that in Example 1.

EXAMPLE 5

Example 1 was repeated in the same manner as described except that the polymer powder was used in conjunction with $C_{12}H_{25}OSO_3Na$ powder in an amount 30% based on the total weight of the polymer powder and the $C_{12}H_{25}OSO_3Na$ powder. The image on the paper was found to be free of deformation and blurs. Further, the ink was found not to penetrate into the other side of the paper. The powder composition was found to used even after 6 months storage in the ambient atmosphere.

EXAMPLES 6 and 7

Example 5 was repeated in the same manner as described except that the polymer powder was used in conjunction with $C_{10}H_{21}OSO_3Na$ powder (Example 6) and with $C_{18}H_{37}OSO_3Na$ powder (Example 7). The results similar to those in Example 5 were obtained.

EXAMPLE 8

Example 5 was repeated in the same manner as described except that the amount of the neutralized acrylic acid monomeric units was increased to 50% by weight. The results similar to those in Example 5 were obtained.

What is claimed is:

1. A process for forming an image on a printing medium, comprising the steps of:
   (a) applying a powder composition comprising a polymer powder having a recurring unit containing at least one carboxyl group, the carboxyl groups of part of the recurring units being in the form of a salt with an aliphatic amine having at least 6 carbon atoms over a surface of a transfer medium to form a layer of said polymer powder;
   (b) forming an image of a liquid ink over said layer of said polymer powder, said polymer powder being soluble or swellable in said liquid ink so that the viscosity of said liquid ink increases when contacted with said polymer powder; and
   (c) contacting said image on said transfer medium with said printing medium so that said image is transferred to said printing medium.

2. The process as claimed in claim 1, wherein said recurring unit is represented by one of the following formulas (I), (II) and (III):

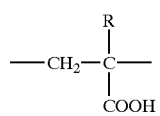
(I)

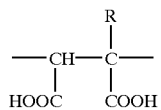
(II)

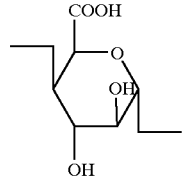
(III)

wherein R is a hydrogen atom or a lower alkyl group.

3. The process as claimed in claim 1, wherein said aliphatic amine is a compound represented by the following formula:

wherein $R^1$, $R^2$ and $R^3$ are independently selected from the group consisting of hydrogen and alkyl groups having 6–18 carbon atoms, with the proviso that at least one of $R^1$, $R^2$ and $R^3$ is an alkyl group.

4. The process as claimed in claim 1, wherein the amount of the units of said polymer powder whose carboxyl groups are in the form of amine salts is 10–50% by weight based on the amount of the units whose carboxyl groups are not neutralized with the amine.

5. The process as claimed in claim 1, wherein said polymer powder is a polymer having first monomeric units of the following formula:

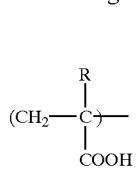

and second monomeric units of by the following formula:

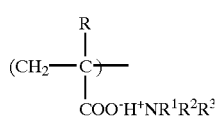

wherein R, $R^1$, $R^2$ and $R^3$ are independently selected from the group consisting of hydrogen and alkyl groups having 6–18 carbon atoms, with the proviso that at least one of $R^1$, $R^2$ and $R^3$ is an alkyl group, with the amount of said first units being 10–50% by weight based on said second units.

6. The process as claimed in claim 1, wherein said powder composition has an average particle diameter of 0.1–50 µm.

7. The process as claimed in claim 1, wherein said powder composition further comprises a surfactant powder.

8. The process as claimed in claim 7, wherein said surfactant powder is a compound represented by the formula $R^4R^5OSO_3Na$ wherein $R^4$ and $R^5$ are, independently from each other, an alkyl group having 6–18 carbon atoms.

9. The process as claimed in claim 1, wherein step (b) is by ink jet printing.

10. The process as claimed in claim 1, wherein said liquid ink contains an anionic pigment capable of associating with said amine salt of said powder.

11. The process as claimed in claim 7, wherein said surfactant powder is in an amount from 1–50% by weight based on the total weight of said surfactant powder and said polymer powder.

12. A powder composition comprising:
a polymer powder having a recurring unit containing at least one carboxyl group, the carboxyl groups of part of the recurring units being in the form of a salt with an aliphatic amine having at least 6 carbon atoms; and a surfactant powder, wherein said surfactant powder is a compound represented by the formula $R^4R^5OSO_3Na$, and wherein $R^4$ and $R^5$ are, independently from each other, an alkyl group having 6–18 carbon atoms.

13. The composition as claimed in claim 12, wherein said recurring unit is represented by one of the following formulas (I), (II) and (III)

$$\begin{array}{c}R\\|\\-CH_2-C-\\|\\COOH\end{array}\quad(I)$$

$$\begin{array}{c}R\\|\\-CH-C-\\|\ \ \ \ |\\HOOC\ \ COOH\end{array}\quad(II)$$

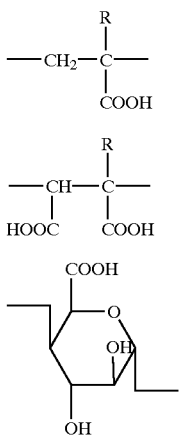

(III)

wherein R is a hydrogen atom or a lower alkyl group.

14. The composition as claimed in claim 12, wherein said aliphatic amine is a compound represented by the following formula:

$$R^1R^2R^3N$$

wherein $R^1$, $R^2$ and $R^3$ are independently selected from the group consisting of a hydrogen and alkyl groups having 6–18 carbon atoms, with the proviso that at least one of $R^1$, $R^2$ and $R^3$ is an alkyl group.

15. The composition as claimed in claim 12, wherein the amount of the units of said polymer powder whose carboxyl groups are in the form of amine salts is 10–50% by weight based on the amount of the units whose carboxyl groups are not neutralized with the amine.

16. The composition as claimed in claim 12, wherein said polymer powder is a polymer having first monomeric units of the following formula:

$$\begin{array}{c}R\\|\\(CH_2-C)-\\|\\COOH\end{array}$$

and second monomeric units of by the following formula:

$$\begin{array}{c}R\\|\\(CH_2-C)-\\|\\COO^-H^+NR^1R^2R^3\end{array}$$

wherein R, $R^1$, $R^2$ and $R^3$ are independently selected from the group consisting of hydrogen and alkyl groups having 6–18 carbon atoms, with the proviso that at least one of $R^1$, $R^2$ and $R^3$ is an alkyl group, with the amount of said first units being 10–50% by weight based on said second units.

17. The composition as claimed in claim 12, wherein said powder composition has an average particle diameter of 0.1–50 µm.

18. The composition as claimed in claim 12, wherein said surfactant powder is in an amount from 1–50% by weight based on the total weight of said surfactant powder and said polymer powder.

* * * * *